United States Patent [19]
Minnick et al.

[11] 3,885,233
[45] May 20, 1975

[54] BUBBLE DETECTION SYSTEMS AND MULTIPLIERS USED THEREIN

[75] Inventors: Robert C. Minnick, Houston, Tex.; Paul T. Bailey, Creve Coeur; Robert M. Sandfort, St. Charles, both of Mo.; Warren L. Semon, Dewitt, N.Y.

[73] Assignee: Monsanto Company, St. Louis, Mo.

[22] Filed: Mar. 8, 1974

[21] Appl. No.: 449,500

Related U.S. Application Data

[63] Continuation-in-part of Ser. No. 283,267, Aug. 24, 1972.

[52] U.S. Cl. .................. 340/174 ZA; 430/174 TF; 340/174 AN; 307/88 LC
[51] Int. Cl. .................. G11c 11/14
[58] Field of Search .................. 340/174 TF, 174 ZA

[56] References Cited

UNITED STATES PATENTS 3,713,118 1/1973 Danylchuk .................. 340/174 ZA
3,798,607 3/1974 Minnick et al. .................. 340/174 TF

*Primary Examiner*—James W. Moffitt
*Attorney, Agent, or Firm*—Lane, Aitken, Dunner & Ziems

[57] ABSTRACT

In a bubble detection system, the reliability of the bubble detection is improved by multiplying each data bubble to be readout into a multiplicity of simultaneous bubbles which are detected by a bubble detector. In one embodiment, the bubble multiplier comprises bubble splitters connected into a tree. In other embodiments, logical bubble splitters are connected into trees. The logical bubble splitters, employing bubble generators to achieve bubble replication, produce bubbles in response to absences of input bubbles as well as presences and the bubbles produced in response to absences are also multiplied so that a multiplicity of bubbles is produced in response to each presence of a data bubble and in response to each absence of a data bubble. Bubble detectors respond to the bubbles representing presences of data bubbles as well as absences of data bubbles to provide a highly reliable indication of the presence or absence of a data bubble.

11 Claims, 7 Drawing Figures

BUBBLE DETECTION SYSTEMS AND MULTIPLIERS USED THEREIN

COPENDING RELATED APPLICATIONS

This application is a continuation-in-part of application Ser. No. 283,267, filed Aug. 24, 1972 and entitled "Magnetic Bubble Logic Family."

BACKGROUND OF THE INVENTION

The invention relates generally to the field of magnetic bubble technology (MBT) and more particularly to bubble multipliers and their use in improving the bubble readout reliability from (MBT) systems.

The containing evolution of MBT has now reached the point where large-scale application to various data processing tasks is practicable. Current interest in MBT is due primarily to the prospect of extremely high bit-packing density, low power consumption and reliability for low-cost mass memories in which the speed of access is secondary to capacity or nonvolatility at a reasonable size and cost per bit.

Briefly, MBT involves the creation, propagation and logical manipulation of single-walled magnetic domains in specially prepared magnetic materials. The application of a static uniform magnetic bias field orthogonal to a sheet of magnetic material having suitable uniaxial anisotropy causes the normally random pattern of magnetic domains to shrink into short cylindrical configurations called bubbles, the common polarity of which is opposite that of the bias field. The bubbles repel each other and can be moved or propagated by a magnetic field in the plane of the sheet. The term bubble used herein is intended to encompass any single-walled magnetic domain, i.e., any domain having a boundary which closes on itself.

Many schemes now exist for propagating bubbles along predetermined channels. One propagation system includes permalloy circuit elements shaped like military service stripes or "chevrons" spaced end-to-end in a thin layer over a sheet of magentic material. The magnetic drive field is continuously rotating in the plane of the sheet. This propagation system is termed "field-accessed" as distinguished from other systems employing loops of electrical conductors disposed on the sheet. The operation of both types of propagation systems is described in the existing literature on MBT.

The use of MBT in data processing stems from the fact that magnetic bubbles can be propagated through channels at a precisely determined rate enabling the creation of uniform streams of bubbles in which the presence or absence of a bubble indicates a binary 1 or 0 at a corresponding bit position within the stream.

One of the most difficult problems facing practical implementation of MBT is readout. Because of this problem, efforts have been made to minimize readout by incorporating logic in the memory to enhance the informational content of each bit. A reliable readout is still, of course, necessary at some point to utilize the information carried by the bubble bits. In the past, optical devices utilizing the Faraday or Kerr effect and magnetoresistive or magnetoconductive devices, for example, employing the Hall effect, have been used as well as simple conductor loops. The basic problem, however, is that the small magnetic field associated with a single miniscule magnetic bubble propagating along a channel is barely distinguishable from the background noise which, by itself, represents the absence of a bubble; and therefore extremely sensitive detectors, entailing such problems as matching, reliability and cost, must be used to effect readout. While detection can be improved by expanding the size of an individual bubble with known devices referred to in the literature as "bubble-stretchers," the physical limitations of this technique have restricted its success.

The copending application of Howard H. Aiken, Paul T. Bailey and Robert M. Sandfort, Ser. No. 401,898, filed Sept. 28, 1973, discloses an improved readout system for magnetic bubbles in which two separate, complementary multiplicities of magnetic bubbles are produced serially, representing respectively, the presences and absences of bubbles in a data bubble stream and a pair of detectors is used to register the presence of the respective multiplicities of bubbles. The outputs of the detectors are compared to produce a single output indicative of the presence or absence of the original data bubble.

SUMMARY OF THE INVENTION

The present invention also provides an improved readout system by means of bubble multiplication. In accordance with the present invention, a bubble multiplier is provided to multiply each data bubble to be read out from the MBT system into a multiplicity of simultaneous bubbles on different field accessed bubble channels. The bubble channels lead to a bubble detection unit in which the simultaneous multiplicity of bubbles combine to provide a reliable indication of the presence or absence of the data bubble. In accordance with one embodiment of the invention, the bubble multiplication is achieved by bubble splitters. In accordance with another embodiment of the invention, logical bubble multiplication is used in accordance with the multiplier disclosed in the above mentioned parent application, Ser. No. 283,267 and illustrated in FIGS. 27 and 28 of that application. This double multiplier employs bubble generators to provide logical multiplication or splitting of the data bubble. The logical multiplication also produces bubbles on additional channels in response to the absence of a data bubble. The presence of bubbles on each of the output channels of the multiplier is detected, both those on which bubbles represent the presence of a data bubble and those on which bubbles represent the absence of a data bubble, to provide a highly reliable readout indication of the presence or absence of a data bubble.

The bubble multipliers of the present invention have other applications in addition to improving the reliability of a bubble readout. The bubble multipliers can also be used to provide selective logic functions or can be used to provide bubble control signals simultaneously to several different bubble circuits.

Accordingly, an object of the present invention is to provide a bubble readout system with improved reliability. Another object of the present invention is to provide improved bubble multiplication circuits of general applicability. Further objects and advantages of the present invention will become readily apparent as the following detailed description of the invention unfolds.

BRIEF DESCRIPTION OF THE DRAWINGS

The word "bubble" used throughout this application is intended to encompass any single walled magnetic domain, defined as a domain having an outer boundary which closes on itself. FIG. 1 illustrates an example of a bubble chip on which a bubble channel is defined. In the bubble chip of FIG. 1 a substrate 10 of non-magnetic garnet supports an epitaxial magnetic bubble garnet layer 12 and a spacing layer 14 of silicon oxide, $SiO_2$, to which permalloy chevron circuit elements 16, 18 and 20 are bonded. The chip is subjected to a magnetic bias field orthoginal to the plane of the bubble garnet layer 12. In the presence of a bias field of suitable strength, a cylindrical bubble 22 will be maintained in the bubble garnet layer 12. A magnetic drive field rotating in the plane of the bubble garnet layer 12 will cause the bubbles 22 to propagate along the track defined by the chevron circuit elements 16, 18 and 20 which are spaced from each other in alignment end to end. The bubble 22 will behave as if it were a mobile, vertical bar magnet with polarization opposite that of the bias field. While the rotating drive is oriented as shown in FIG. 1, the bubble seeks an energy minimum under pole 1 of chevron 16. As the drive field is uniformly rotated clockwise through one period of 360°, the bubble 22 moves through positions 2 and 3 to position 4 of the next chevron circuit 18 which corresponds to the position or pole 1 under chevron 16. Thus the length of each chevron corresponds to one complete cycle of the drive field. For this reason, the bubble 22 is propagated along the propagation track in a completely determinate fashion.

Figure 1:
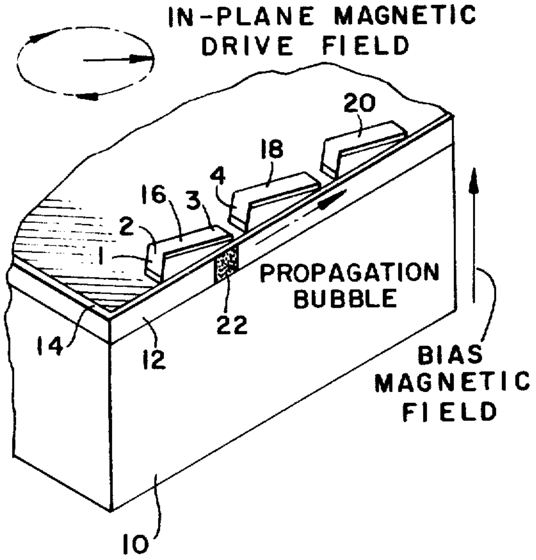
FIG. 1 is a schematic fragmentary perspective view of a bubble channel.
Figure 2:
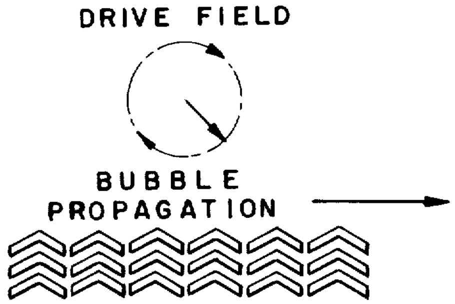
FIG. 2 is a plan view of a bubble channel defined by its chevron pattern.

For the purpose of guarding against defects in the garnet bubble material as well as in the permalloy chevrons themselves, chevrons may be packed as shown in FIG. 2 to form a multi-element propagation track or channel. A bubble will be propagated from left to right as viewed in FIG. 2 with a clockwise rotating drive field as illustrated in FIG. 2.

Figure 3:
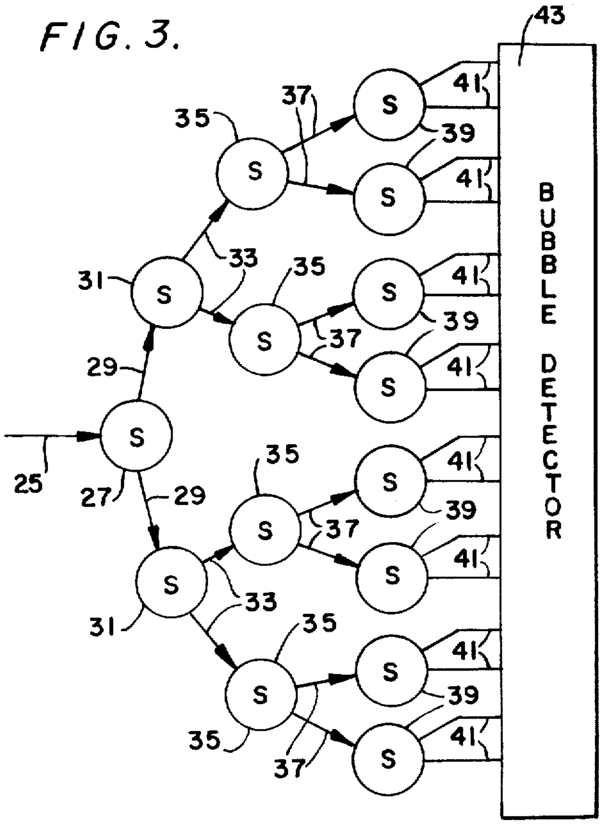
FIG. 3 is a block diagram illustrating the bubble detection system of the present invention employing bubble splitters.

In the schematic illustration of the embodiment of the invention as shown in FIG. 3, the reference number 25 is an input bubble channel which may be a chevron circuit as illustrated in FIG. 2. The input channel leads to a bubble splitter 27 which splits each input bubble into the two output bubbles on each of two output channels 29 and 31. The bubble splitter 27 may, for example, be of the type disclosed in the Danylchuk U.S. Pat. No. 3,713,118, or of the type disclosed in the article entitled "A Self-Contained Magnet Bubble Domain Memory Chip" in the June, 1972 *IEEE Transactions on Magnetics*, by Chang et al., Vol. Mag-8, No. 2, pp. 214–222. The channels 29 lead to splitters 31 which will split the bubbles received on the channels 29 into four bubbles on four output channels 33 which, in turn, lead to four splitters 35. The splitters 35 split the four bubbles received on channels 33 into eight bubbles on eight channels 37, which lead to eight splitters 39. The splitters 39 split the eight bubbles received on channels 37 into 16 bubbles on output 16 channels 41, which lead to a bubble detector 43. The detector 43 thus receives 16 bubbles simultaneously in parallel for each input bubble received on channel 25. The detector 43 employs a magnetoresistive element which extends over each of the bubble channels to be magnetically influenced by each of the received bubbles simultaneously. The magnetoresistive element will exhibit a different value of resistance when bubbles are present than when they are absent and the magnitude of the difference in value will depend upon the number of bubbles acting on the magnetoresistive element. The detector 43 generates an electrical output signal corresponding to the resistance of the magnetoresistive element. Thus, the detector 43 responding to 16 simultaneous bubbles produces a large amplitude variation between the conditions of presences and absences of input data bubbles on channel 25. Thus, highly reliable bubble detection is provided.

Instead of a single detector for all of the output channels 41, a separate detector could be provided for each channel 41 and the signals from these detectors added either in analog fashion or digitally to provide a reliable output indication of the presence or absence of an input bubble.

Figure 4:
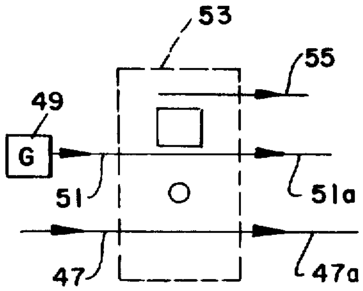
FIG. 4 is a schematic illustration of a logical bubble splitter used in another embodiment of the present invention.

Instead of multiplying the data bubble on the input channel by means of bubble splitters, the bubbles can be multiplied logically employing bubble generators. For example, as shown in FIG. 4, the data bubble is received on input channel 47. A stream of bubbles is continuously generated by a bubble generator 49 on channel 51. The bubble generator 49 generates a bubble for each position on input channel 47 in which a data bubble can occur. The bubbles on 47 and 51 are fed to the Y and Z inputs of a Class 21 type bubble logic gate of the type described in the above mentioned parent application Ser. No. 283,267 and illustrated in FIG. 7 of this application. In the gate 53, a bubble transfer path is provided between the channel 51 and a third channel 55 and bubbles will be transferred from the channel 51 to the channel 55 only if a bubble is simultaneously present in the gate 53 on the channel 47. Thus, each time a data bubble appears on input channel 47, the corresponding bubble generated by the bubble generator 49 will be repelled to the output channel 55. The data bubble on input channel 47 will also travel to output channel 47*a* so that in response to each data bubble on input channel 47, two bubbles will be produced by the gate 53, one on its output channel 55 and one on its output channel 47*a*. When no data bubble is received on input channel 47, then the bubble generated by the generator 49 on channel 51 at the position corresponding to the absence of a bubble on channel 47 will travel through the gate 53 to the output channel 51*a* and, thus, the gate 53 will produce a bubble on its output channel 51*a* in response to each absence of a bubble on input channel 47. The circuit of FIG. 4 is thus a logical bubble splitter producing two simultaneous output data bubbles in response to each input bubble and producing an output bubble on a different channel in response to each absence of an input bubble.

Figure 5:
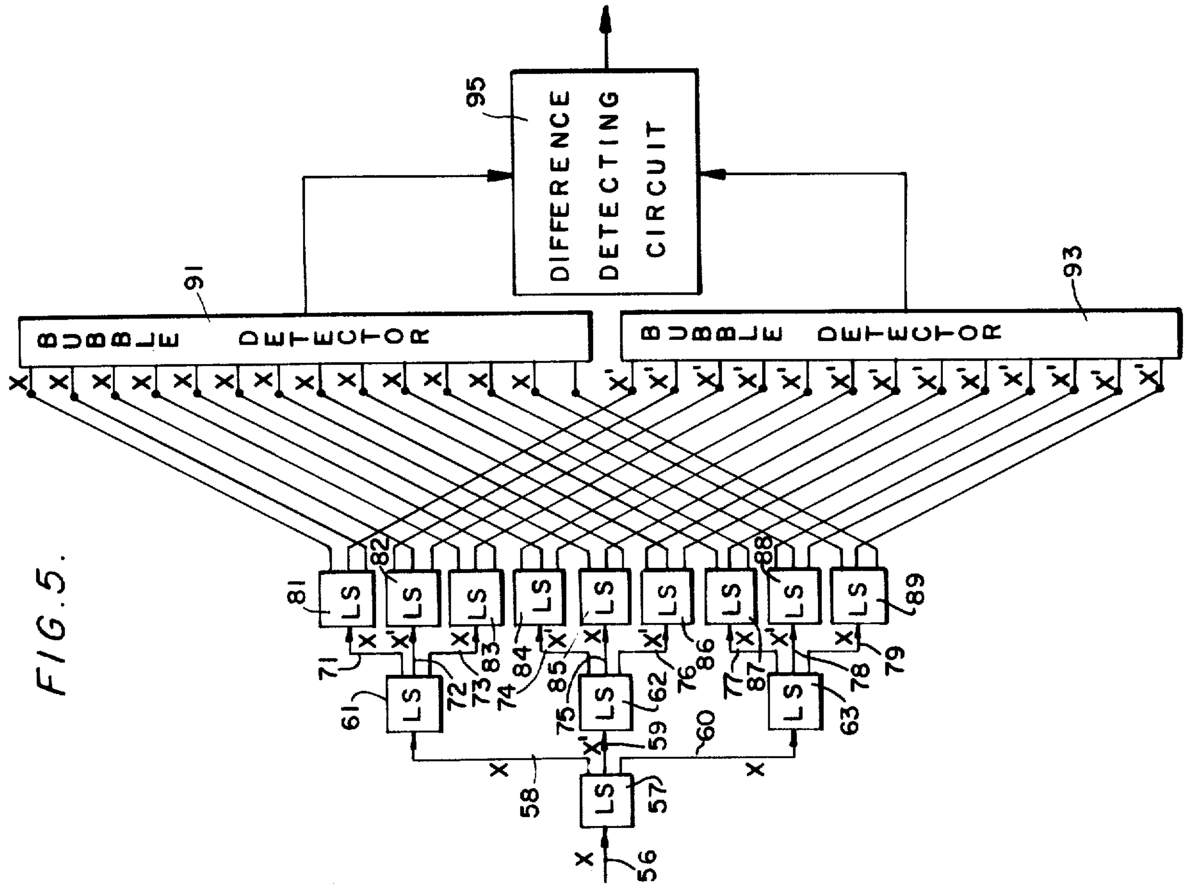
FIG. 5 is a block diagram of a bubble detection system in accordance with the present invention employing the logical splitter of FIG. 4.

In accordance with the present invention, the logical splitter circuit of FIG. 4 is connected in a tree to provide further logical multiplication of the input data bubble as shown in FIG. 5. In the circuit of FIG. 5, each logical splitter identical to the circuit as shown in FIG. 4, is labelled LS. A data bubble to be readout is fed over channel 56 to the lowest level logical splitter 57 which has three output channels 58, 59 and 60 leading to second level logical splitters 61, 62 and 63, respectively. The logical splitter 57 produces a bubble on each output channel 58 and 60 in response to each input data bubble and produces a bubble on output channel 59 in response to each absence of an input data bubble. In FIG. 5, as well as in FIG. 7 described below, the legend $x$ appears next to each channel on which a bubble represents the presence of a data bubble on the input channel of the system and $x'$ appears next to each channel on which a bubble represents the absence of a data bubble on the input channel. The splitters 61, 62 and 63 each have three output channels and these nine ouput channels designated 71 through 79, respectively, lead to further logical splitters 81 through 89, respectively. The splitter 61 receiving a bubble on channel 58 in response to each data bubble on input channel 56 produces two bubbles on channel 71 and 73 in response to each data bubble in input channel 56 and produces a bubble on channel 72 in response to each absence of a bubble on output channel 56. Similarly, the logical splitter 63 produces bubbles on channels 77 and 79 in response to each data bubble on input channel 56 and produces a bubble on channel 78 in response to each absence of a data bubble on input channel 56. The logical splitter 62, on the other hand, receiving a bubble on channel 59 in response to the absence of a data bubble on channel 56 produces bubbles on channels 74 and 76 in response to each absence of a data bubble on channel 56 and produces a data bubble on channel 75 in response to each presence of a data bubble on input channel 56. The splitters 81, 83, 85, 87 and 89 receiving an input bubble in response to each presence of a data bubble on input channel 56 each produce bubbles on two output channels in response to each presence of a data bubble and produce an output bubble on the third output channel in response to each absence of an input data bubble on channel 56. Each of the logical splitters 82, 84, 86 and 88, receiving an input bubble in response to each absence of a data bubble on input channel 56, produces output bubbles on two channels in response to each absence of a data bubble on input channel 56 and produces an output bubble on the third output channel in response to the presence of a data bubble on input channel 56. Thus, the logical splitters 81 through 89 produce on 14 output channels 14 simultaneous bubbles in response to each presence of a bubble on input channel 56 and on 13 output channels 13 simultaneous bubbles in response to each absence of a data bubble on input channel 56. The bubbles on the output channels of logical splitters 81 through 89 are fed to two detectors, one detector 91 connected to channels on which bubbles are generated in response to each presence of a data bubble on input channel 56 and the other detector 93 connected to channels on which simultaneous bubbles are generated in response to each absence of a data bubble on input channel 56. The detectors 91 and 93 like the detector 43 each employ a magnetoresistive element, which is connected to a resistance difference detecting circuit such as a bridge. The magnetoresistive elements of the detectors 91 and 93 respond to each of the received bubbles to vary its resistance value. Because each magnetostrictive element responds to a large number of bubbles, a large resistance charge is achieved between the condition when no bubbles are received and when bubbles are received. Because the detector 91 only receives bubbles in response to the presence of a bubble on input channel 56 and detector 93 only receives bubbles in response to the absence of a bubble on channel 56, the values of the resistances of these detectors will vary inversely in response to the presences and absences of bubbles on the input channel 56 and this inverse variation is detected by the circuit 95 to provide a highly reliable, easily recognizable readout signal indication of the presence or absence of a data bubble on channel 56.

The logical splitters 57, 61–63 and 81–89 are connected by bubble channels 58–60 and 71–79 into a three level tree, which is a bubble multipler. The number of bubbles that will be produced by this multiplier depends upon the number of levels of the tree in which the logical splitters are connected. An N level tree will produce $(3^N + 1)/2$ bubbles in response to each presence of an input bubble and will produce $(3^N - 1)/2$ bubbles in response to each absence of a data bubble on input channel 56.

Figure 6:
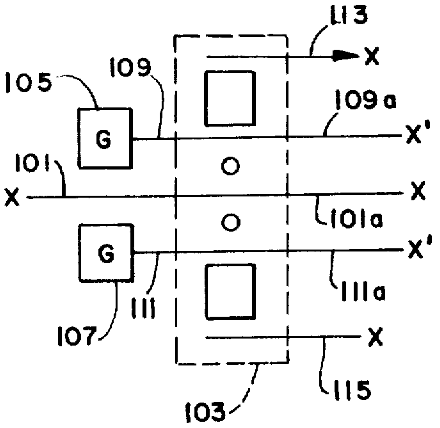
FIG. 6 is a logical bubble splitter used in another embodiment of the present invention.

Another logial splitter used in a another bubble multiplier of the present invention is illustrated in FIG. 6. This bubble splitter is described in the above mentioned copending application Ser. No. 283,267 and is illustrated in FIG. 27*d* of this application. As shown in FIG. 6, a data bubble on input channel 101 is fed to a logical bubble gate 103 which also receives bubbles from bubble generators 105 and 107 on channels 109 and 111, respectively. Each bubble on input channel 101 will be transmitted through to the output channel 101a of the gate. In addition, each data bubble on channel 101 will cause the corresponding bubble on channel 109 to be repelled to an output channel 113 and will cause the corresponding bubble on channel 111 to be repelled to output channel 115. Thus, for each data bubble produced on input channel 101, the bubbles will be produced on output channels 113, 115 and 101*a*. Whenever an absence of a data bubble occurs on input channel 101, the bubbles generated on channels 109 and 111 will pass through the gate to the output channels 109*a* and 111*a* so that for each absence of a data bubble on input channel 101, bubbles will be produced on output channels 109*a* and 111*a*.

Figure 7:
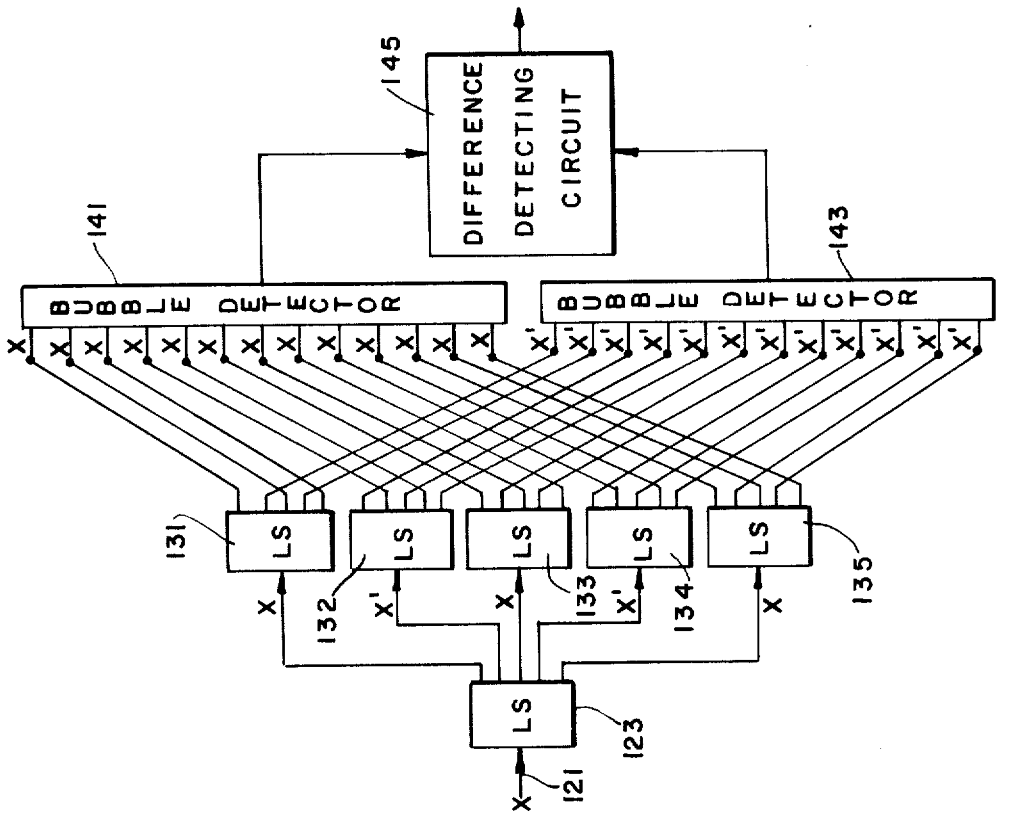
FIG. 7 is a block diagram of a bubble detection system employing the logical splitter of FIG. 6 in accordance with still another embodiment of the present invention.

In accordance with the present invention, the logical splitters of FIG. 6 are connected in a tree to provide a bubble multiplier as shown in FIG. 7 in which each of the logical splitters of FIG. 6 is represented as a block labelled LS. The bubble multiplier of FIG. 7 is shown in FIG. 28 in copending application Ser. No. 283,267. Each input data bubble to be read out is applied on input channel 121 to the lowest level logical splitter 123, the five output channels of which feed further logical splitters 131 through 135. The logical splitters 131, 133 and 135 each receive an input bubble in response to each presence of a bubble on input channel 121 whereas each of the logical splitters 132 and 134 receive a bubble in response to each absence of a bubble on input channel 121. Accordingly, the logical splitters 131, 133 and 135 each produce on three of their respective output channels simultaneous bubbles in response to each presence of a bubble on input channel 121 and produce on two of their respective output channels simultaneous bubbles in response to each absence of a bubble on input channel 121. The logical splitters 132 and 134, each receiving an input bubble in response to an absence of a data bubble on input channel 121, will produce on three of their respective output channels simultaneous bubbles in response to each absence of a data bubble on input channel 121 and will produce on two of their respective output channels simultaneous bubbles in response to each presence of a data bubble on channel 121. Thus, on 13 of the 25 output channels of the logical splitters 131 through 135, simultaneous bubbles will be produced in response to each presence of a data bubble on input channel 121 and on 12 of the output channels of the logical splitters 131 through 135 simultaneous bubbles will be produced in response to each absence of a data bubble on input channel 121. The output channels of the logical splitters 131 through 135 lead to detectors 141 and 143. The detector 141 is connected to channels on which the bubbles are produced in response to presences of data bubbles on input channel 121 and the detector 143 is connected to channels on which bubbles are produced in response to absences of data bubbles on input channel 121. The bubble detectors 141 and 143 contain magnetoresistive elements which respond to each of the received bubbles and are connected in a resistance difference detecting circuit 145 like the detectors 91 and 93 of the circuit of FIG. 5. In the same manner as in the circuit of FIG. 5, the difference detecting circuit 145 provides a highly reliable, easily recognized signal indication of the presence or absence of each data bubble on channel 121.

The multiplier circuit of FIG. 7 comprising the logical splitters 123 and 131 through 135 may be expanded to as many levels as desired and the multiplication achieved will depend on the number of levels used. An N level tree will produce $(5^N+1)/2$ bubbles in response to each presence of an input data bubble and will produce $(5^N-1)/2$ bubbles in response to each absence of a data bubble.

In the circuits of FIGS. 5 and 7, the points which bubble channels cross between the logical splitters 81 and 89 and the detector 91 are easily implemented because simultaneous bubbles never occur at the crossing points. If avoidance of any crossing points is desired, a separate detector could be provided for each output channel of the logical splitters. The outputs from the individual detectors could then be combined in analog circuits or digitally to provide a highly reliable indication of the presence or absence of a data bubble in the input channel.

The bubble multipliers illustrated in FIGS. 3, 5 and 7 can be used in applications other than improving the reliability of bubble readout. For example, each of these bubble multipliers could be used to provide simultaneous bubble signals to a plurality of control circuits or logic circuits when such simultaneous control is required. The above description is of preferred embodiments of the invention and many modifications may be made thereto without departing from the spirit and scope of the invention, which is defined in the appended claims.

We claim:

1. A magnetic bubble readout system comprising a field accessed input channel for receiving and transmitting magnetic data bubbles, a bubble multiplier connected to receive magnetic bubbles transmitted through said input channel and producing a plurality of simultaneous magnetic bubbles on different field accessed output bubble channels in responses to each data bubble received on said input channel, and bubble detection means connected to receive bubbles transmitted through said output channels and responsive to the bubbles received simultaneously through each of said output channels to generate a signal indication representing the presence or absence of each data bubble on said input channel and having a signal level dependent on the number of bubbles detected on said output channels.

2. A magnetic bubble readout system as recited in claim 1, wherein said bubble multiplier comprises a plurality of bubble splitting means each operable to separate each input bubble into two simultaneous output bubbles on different output channels, said bubble splitting means being connected into a tree of a plurality of levels wherein the outputs of each bubble splitter in each preceding level feeds inputs of different bubble splitters in succeeding levels of said tree, said bubble detection means being responsive to the bubbles on each of the outputs of the bubble splitters in the last level of said tree.

3. A magnetic bubble readout system comprising an input channel for receiving magnetic data bubbles, a bubble multiplier connected to receive magnetic bubbles on said input channel and producing a plurality of simultaneous magnetic bubbles on different output bubble channels in response to each data bubble received on said input channel, and bubble detection means responsive to the bubbles produced simultaneously on each of said output channels to generate a signal indication representing the presence or absence of each data bubble on said input channel, said bubble multiplier comprising a logical splitter having an input and at least three outputs, a bubble channel connecting said input to a first one of said outputs to transmit each bubble received by such splitter to said first one of said outputs, a bubble generator producing an output bubble for each bubble position on said bubble channel of said splitter, and logic means responsive to bubbles on said bubble channel of said splitter to transmit each bubble generated by said generator to a second one of said outputs in response to a simultaneous bubble on said bubble channel of said splitter and to transmit each bubble generated by said bubble generator to a third of said outputs in response to each absence of a bubble on said bubble channel of said splitter; said bubble detection means being responsive to the bubbles on each of said three outputs to generate said signal indication.

4. A bubble detection system as recited in claim 3, wherein said logic means comprises a second bubble channel leading to said second one of said outputs and a third bubble channel connecting said bubble generator to said third one of said outputs between said first mentioned bubble channel of said bubble splitter and said second channel, and bridging means for transmitting a bubble from said third channel to said second channel only when repelled by a simultaneous bubble in said first mentioned channel of said splitter.

5. A magnetic bubble readout system as recited in claim 3, wherein said bubble multiplier comprises a plurality of logical splitters each as recited in claim 3 connected into a tree having a plurality of levels wherein the outputs of the logical splitters in each preceeding level feed inputs of different logical splitters in succeeding levels of said tree, said bubble detection means being responsive to the bubbles on each of the outputs of the logical splitters of the last level of said tree.

6. A magnetic bubble readout system as recited in claim 3, wherein said logical splitter each has five outputs, a second bubble generator producing an output bubble for each bubble position on said bubble channel of said splitter and second logic means responsive to bubbles on said bubble channel of said splitter to transmit each bubble generated by said second generator to a fourth one of said outputs in response to a simultaneous bubble on said bubble channel of said splitter and to transmit each bubble generated by said second generator to a fifth one of said outputs in response to each absence of a bubble on said bubble channel of said splitter; said bubble detection means being responsive to the bubbles on each of said five outputs to generate said signal indication.

7. A magnetic bubble readout system as recited in claim 6, wherein said first mentioned logic means comprises a second bubble channel connected to said second one of said outputs, a third bubble channel connecting the output of said first mentioned bubble generator to said third one of said outputs between said second channel and said first mentioned channel of said splitter and bridging circuit means between said second and third channels for transmitting a bubble from said third channel to said second channel only when repelled by a simultaneous bubble on said first mentioned channel of said splitter; and said second logic means comprises a fourth channel connected to said fourth one of said outputs, a fifth channel connected from said second generator to said fifth one of said outputs between said fourth channel and said first mentioned channel of said splitter and bridging circuit means between said fourth and fifth channels for transmitting a bubble from said fifth channel to said fourth channel only when repelled by a simultaneous bubble on said first mentioned channel of said splitter.

8. A magnetic bubble readout system as recited in claim 6, wherein said bubble multiplier comprises a plurality of logical splitters as recited in claim 6, said logical splitters being connected into a tree of a plurality of levels wherein the outputs of each bubble splitter in each preceeding level feeds intputs of different bubble splitters in succeeding levels of said tree, said bubble detection means being repsonsive to the bubbles on each of the outputs of the logical splitters in the last level of said tree to generate said signal indication.

9. A magnetic bubble readout system comprising an input channel for receiving magnetic data bubbles, a bubble multiplier connected to be responsive to magnetic bubbles on said input channel and producing a plurality of simultaneous magnetic bubbles on a first set of different outputs in response to each data bubble received in said input channel and to produce a plurality of simultaneous bubbles on a second set of different outputs in response to each absence of a data bubble received on said input channel, and bubble detection means responsive to bubbles produced simultaneously on each of the outputs of said first set to generate a first signal indication representing the presence of each data bubble on said input channel and having a signal level dependent on the number of bubbles produced on said first set of outputs and responsive to the bubbles produced simultaneously on the outputs of said second set to generate a second signal indication representing each absence of a data bubble on said input channel and having a signal level dependent on the number of bubbles produced on said second set of outputs.

10. A bubble multiplier comprising means defining at least three bubble channels for transmitting magnetic bubbles comprising first, second and third adjacent tracks of magnetic circuit elements, said third track being adapted to receive presences and absences of bubbles representing a binary variable, a bubble generator connected to supply magnetic bubbles to the said second track simultaneous with and at the same rate said binary variables are applied to said third track, a briding pattern of circuit elements connected between said second track and said first track adapted to transmit magnetic bubbles from said second track to said first track only if repelled by a simultaneous bubble in said third track, said third track being sufficiently close to said second track to repel simultaneous bubbles occurring in second track.

11. A bubble multiplier as recited in claim 10, wherein said bubble channel defining means defines at least five bubble channels comprising additional fourth and fifth tracks of magnetic circuit elements adjacent to said first, second and third adjacent tracks, a bubble generator connected to supply magnetic bubbles to said fourth track simultaneously with and at the same rate binary variables are applied to said third track, a bridging pattern of circuit elements connected between said fourth track and said fifth track adapted to transmit magnetic bubbles from said fourth track to said fifth track only if repelled by a simultaneous bubble in said third track, said third track being sufficiently close to said fourth track to repel simultaneous bubbles occurring in said fourth track.

* * * * *